(12) United States Patent
Kuronen et al.

(10) Patent No.: US 11,306,265 B2
(45) Date of Patent: *Apr. 19, 2022

(54) FUEL COMPOSITIONS WITH ENHANCED COLD PROPERTIES AND METHODS OF MAKING THE SAME

(71) Applicant: NESTE OYJ, Espoo (FI)

(72) Inventors: Markku Kuronen, Porvoo (FI); Ulla Kiiski, Porvoo (FI)

(73) Assignee: Neste Oyj, Espoo (FI)

(*) Notice: Subject to any disclaimer, the term of this patent is extended or adjusted under 35 U.S.C. 154(b) by 0 days.

This patent is subject to a terminal disclaimer.

(21) Appl. No.: 17/167,219

(22) Filed: Feb. 4, 2021

(65) Prior Publication Data

US 2021/0163835 A1  Jun. 3, 2021

Related U.S. Application Data

(63) Continuation of application No. 15/876,426, filed on Jan. 22, 2018, now Pat. No. 10,954,459.

(30) Foreign Application Priority Data

Jan. 27, 2017  (FI) .................................... 20175074

(51) Int. Cl.
  *C10L 1/02*  (2006.01)
  *C10L 1/08*  (2006.01)
  *C10L 1/06*  (2006.01)

(52) U.S. Cl.
  CPC ............. *C10L 1/023* (2013.01); *C10L 1/026* (2013.01); *C10L 1/06* (2013.01); *C10L 1/08* (2013.01); *C10L 2200/0446* (2013.01); *C10L 2200/0469* (2013.01); *C10L 2270/026* (2013.01); *Y02E 50/10* (2013.01); *Y02P 30/20* (2015.11)

(58) Field of Classification Search
  CPC .. C10L 1/023; C10L 1/026; C10L 1/08; C10L 1/06; C10L 2200/0446; C10L 2200/0469; C10L 2270/026; Y02E 50/10; Y02P 30/20
  See application file for complete search history.

(56) References Cited

U.S. PATENT DOCUMENTS 7,354,507 B2  4/2008  Gopalakrishnan et al.
7,999,143 B2  8/2011  Marker et al.
8,742,183 B2  6/2014  McCall et al.
(Continued)

FOREIGN PATENT DOCUMENTS

CN  1839196 A  9/2006
EP  1956070 A1  8/2008
(Continued)

OTHER PUBLICATIONS

Chinese office action for Chinese Patent Application No. 201880008373 dated Dec. 29, 2020.
(Continued)

*Primary Examiner* — Ellen M McAvoy
(74) *Attorney, Agent, or Firm* — Buchanan Ingersoll & Rooney PC

(57) ABSTRACT

Methods of making a diesel fuel blend having enhanced cold properties; methods of lowering the cloud point of a mineral middle distillate fuel; and diesel fuel blends including a blend of a renewable fuel and a mineral middle distillate fuel.

20 Claims, 2 Drawing Sheets

(56) References Cited

U.S. PATENT DOCUMENTS

| | | | |
|---|---|---|---|
| 9,006,501 | B2 | 4/2015 | Brafman et al. |
| 9,469,818 | B2 | 10/2016 | Baldiraghi et al. |
| 2004/0055209 | A1 | 3/2004 | Jakkula et al. |
| 2005/0109672 | A1 | 5/2005 | Bauldreay et al. |
| 2006/0207166 | A1 | 9/2006 | Herskowitz et al. |
| 2006/0264684 | A1* | 11/2006 | Petri .................... C11B 3/04 585/250 |
| 2008/0154073 | A1* | 6/2008 | Petri ..................... C10G 45/58 585/240 |
| 2008/0163542 | A1 | 7/2008 | Krupa et al. |
| 2009/0229172 | A1 | 9/2009 | Brady et al. |
| 2010/0083563 | A1 | 4/2010 | Miller |
| 2011/0047862 | A1 | 3/2011 | Mayeur et al. |
| 2011/0105812 | A1* | 5/2011 | Marker ..................... C10L 1/08 585/14 |
| 2011/0126449 | A1 | 6/2011 | Xu et al. |
| 2011/0219671 | A1 | 9/2011 | Hanks et al. |
| 2011/0239532 | A1* | 10/2011 | Baldiraghi ............... C10G 3/44 44/388 |
| 2012/0090223 | A1* | 4/2012 | Kokayeff ............... C10G 45/60 44/308 |
| 2012/0142984 | A1* | 6/2012 | Roberts ..................... C10G 3/45 585/275 |
| 2012/0283491 | A1 | 11/2012 | Zhou et al. |
| 2013/0261360 | A1 | 10/2013 | Eizenga et al. |
| 2013/0333652 | A1* | 12/2013 | Trewella .................. C10L 1/06 123/1 A |
| 2014/0187827 | A1 | 7/2014 | Abdallah et al. |
| 2014/0319024 | A1* | 10/2014 | Kokayeff ................ C10L 1/026 208/134 |
| 2015/0068109 | A1 | 3/2015 | Baldiraghi et al. |
| 2016/0289568 | A1 | 10/2016 | Dutta et al. |
| 2018/0148653 | A1* | 5/2018 | Germanaud ............. C10G 2/32 |

FOREIGN PATENT DOCUMENTS

| | | |
|---|---|---|
| EP | 2019132 A1 | 1/2009 |
| EP | 2022839 A1 | 2/2009 |
| EP | 2264129 A2 | 12/2010 |
| EP | 1664249 B1 | 11/2012 |
| EP | 2382286 B1 | 3/2016 |
| ES | 2574990 T3 | 6/2016 |
| GB | 2449009 A | 11/2008 |
| JP | 2007308573 A | 11/2007 |
| JP | 2007308576 A | 11/2007 |
| MX | 2011003488 A | 5/2011 |
| MX | 2013011769 A | 1/2014 |
| RU | 2348677 C2 | 3/2009 |
| WO | 0020534 A1 | 4/2000 |
| WO | 2004022674 A1 | 3/2004 |
| WO | 2005026297 A1 | 3/2005 |
| WO | 2008113492 A1 | 9/2008 |
| WO | 2010039693 A2 | 4/2010 |
| WO | 2014149117 A2 | 9/2014 |
| WO | 201513463 A1 | 12/2015 |
| WO | 2018037163 A1 | 3/2018 |

OTHER PUBLICATIONS

"Fossils into Fuels", The Institute of Petroleum, 1998.
Opposition filed by UPM-Kymmene Corporation for Swedish Patent Application No. 1850085-0 dated Oct. 13, 2020.
Opposition filed by AWA Sweden AB for Swedish Patent Application No. 1850085-0 dated Oct. 14, 2020.
Japanese Office Action for Japanese Patent Application No. 2019540078 dated Sep. 15, 2020 (English Translation).
Office Action dated Dec. 24, 2019, by the Russian Patent Office in corresponding Russian Patent Application No. 2019123277, and an English Translation of the Office Action. (18 pages).
Finnish Patent Opposition document for patent 127307B.
Finnish Standards Association, SFS-EN23015:en:1995 edition 1, "Petroleum and related products from natural or synthetic sources. Determination of cloud point (ISO3015:2019)".
Finnish Standards Association, "Petroleum Products. Determination of Cloud Point (ISO 3015:1992)" dated Jan. 2, 1995.
The Limitations of the Cloud Point Measurement Techniques and the Influence of the Oil Composition on its Detection: by Joao A. P. Coutinho, Jean-Luc Daridon.
PRV Notice issued on Jun. 29, 2018, by the Swedish Patent Office in Swedish Patent Application No. 1850085-0. (5 pages).
Opposition, Jul. 10, 2019. (1 page).
Patent Tables 1-4. (2 pages).
Neste Renewable Diesel Handbook, May 2016. (57 pages).
C. Lira-Galeana et al., "Thermodynamics of Way Precipitation in Petroleum Mixtures", Thermodynamics, AlChE Journal, Jan. 1996, pp. 239-248, vol. 42, No. 1. (10 pages).
D.G.C. Goberdhan et al., "The Impact of Fuel Solvency on Middle Distillate Cold Flow Performance", SAE International, Apr. 14, 2015 (8 pages).
W.A. Affens et al., "Effect of Composition on Freezing Points of Model Hydrocation Fuels", Fuel, Apr. 1984, pp. 543-547, Vo. 63 (5 pages).
C. Wilken et al., "A Comparison of the Properties and Cold Flow Performance of Summer and Winter GTL Diesel", SAE International J Fuels Lubr., Jun. 2016, pp. 430-442, vol. 9, No. 2 (14 pages).
T.G. Smagala et al., "Hydrocarbon Renewable and Synthetic Diesel Fuel Blendstocks: Composition and Properties", Energy & Fuels, 2013, pp. 237-246, vol. 27 (10 pages).
Opposition, Jul. 5, 2019. (17 pages).
Opposition, Jul. 4, 2019. (29 page).
Patent Cooperation Treaty PCT Third Party Observation for PCT/FI2018/050060 dated Jan. 25, 2018.
Office Action dated Dec. 19, 2018, by the Finnish Patent Office in corresponding Finnish Patent Application No. 20175074. (25 pages).
International Search Report of the International Searching Authority (PCT/ISA/220 and PCT/ISA/210) dated Apr. 9, 2018, by the International Bureau of European Patent Office in corresponding International Application No. PCT/FI2018/050060. (6 pages).
Office Action dated Jul. 26, 2018, by the Spanish Patent Office in corresponding Spanish Patent Application No. 201830061 (3 pages).
Finnish Search Report for Finnish Application No. 20/175,074 dated May 26, 2017.
Notice of opposition against French patent FR 18 50599 on the name of Neste Oyj (French Translation) dated Feb. 11, 2022.
Notice of opposition against French patent FR 18 50599 on the name of Neste Oyj (English Translation) dated Feb. 11, 2022.
https://viewerbdc.afnor.org/html/display/CT18bvDyn1Q1 Sep. 20, 1994.
"Guide to ASTM Test Methods for the Analysis of Petroleum Products and Lubricants" 2nd Edition, R.A. Kishore Nadkarni, ASTM International; http://www.astm.org 2007.
"Complete Group-Type Quantification of Petroleum Middle Distillates Based on Comprehensive Two-Dimensional Gas Chromatography Time-of-Flight Mass Spectrometry (GCxGC-TOFMS) and Visual Basic Scripting" Maximilian K. Jennerwein, et al., Energy & Fuels Article; pubs.acs.org/EF; 2014 American Chemical Society; dx.doi.org/10.1021/ef501247h | Energy Fuels 2014, 28, 5670-5681.

\* cited by examiner

US 11,306,265 B2

FUEL COMPOSITIONS WITH ENHANCED COLD PROPERTIES AND METHODS OF MAKING THE SAME

CROSS-REFERENCE TO RELATED APPLICATIONS

This application is a continuation application of U.S. patent application Ser. No. 15/876,426 which claims priority to Finnish Patent Application No. 20175074, filed on Jan. 27, 2017.

FIELD OF THE INVENTION

The present invention relates to fuel compositions having enhanced cold properties that are blends of mineral middle distillate fuels and renewable fuels and methods for making such compositions.

BACKGROUND OF THE INVENTION

Sufficient cold temperature performance all year round is an essential requirement for diesel fuel. Due to large seasonal and geographic temperature variability, middle distillate fuels are blended and adjusted to minimize problems during cold weather such as crystallization and solidification of the fuel which affects the viscosity of the fuel, its volatility, and its ability to pass through fuel filters.

The most important properties of fuels related to their cold temperature operability are cloud point, pour point, and cold filter plugging point. As a middle distillate fuel is cooled, it will reach its cloud point. This is the temperature at which paraffin wax falls out of solution and starts to form wax crystals in the fuel. The storage temperature of a fuel is recommended to be higher than its cloud point. As the fuel is further cooled, it will eventually reach its pour point. This is the temperature at which the fuel will no longer flow or the point at which the fuel gels or turns into a solid. The third important property of a middle distillate fuel is its cold filter plugging point, which is the lowest temperature the fuel is filterable and can be used in vehicles without problems.

Because a component with poor cold properties will dominate in a blend, a fuel will be improved by adding components that have better cold properties. The term "poor" or "poorer" refers to a higher temperature value of cloud point or cold filter plugging point, and the term "better" refers to a lower temperature value of a cloud point or cold filter plugging point.

Several approaches have been described to achieve transportation fuels that have good cold temperature operability. U.S. Pat. No. 9,006,501B2 discloses a process for producing a renewable fuel blend, wherein a biologically derived feedstock is hydrotreated, and C14, C16, and C18 normal paraffins (n-paraffins) are recovered from the hydrotreated effluent and blended with a renewable middle distillate. During this process, n-paraffins are provided to the blend in quantities such that the blend does not require a pour point reducing treatment to achieve a low pour point. This process is complicated by requiring a step of recovering C14, C16, and C18 n-paraffins.

U.S. Patent Application Publication No. 2008/0163542 A1 discloses a synergistic fuel oil composition that enhances the cold temperature operability of the fuel. The composition comprises a petroleum-based component and a renewable fuel component. Biodiesel, ethanol, and biomass are mentioned as examples of renewable fuel sources. Under ASTM D7467, however, only 6% to 20% biodiesel can be used in diesel equipment with no, or only minor, modifications.

It is also generally known that biodiesels, e.g., fatty acid methyl esters (FAME), made by the trans-esterification process are inherently more sensitive to cold temperature operability compared to typical petroleum-derived fuels. In some cases fatty acid methyl esters can cause higher particle emissions and smoke development in a cold-driven engine. The volume of fatty acid methyl esters allowed in diesel fuels may also be limited. European standards EN 16734 and EN 16709 specify the requirements and test methods for diesel fuels that contain fatty acid methyl esters. According to EN 16734, B10 diesel fuel is diesel fuel that contains only up to 10 vol. % fatty acid methyl esters. According to EN 16709, high fatty acid methyl ester diesel fuels (B20 and B30) contain only up to 20 vol. % or 30 vol. % fatty acid methyl esters.

EP1664249B1 discloses fuel compositions prepared by blending petroleum-derived kerosene-based fuels and Fischer-Tropsch-derived kerosene-based fuels. It discloses a finding that the freeze point of such a blend is lower than the freeze points of both the blend's components. The components used in these fuel compositions are not bio-based, however.

For the production of cold operable bio-based fuels, alternative fuel compositions and blending methods are needed that are economical and have no volume restrictions on the amount of bio-based fuel.

The cloud point of a fuel blend is a highly nonlinear combination of the cloud points of the original fuels. According to the state of the art, a blend will normally have a poorer cloud point than the weighted mean of the cloud points of its components. Therefore, while the cloud point of a fuel may be improved by adding a component that has a remarkably better cold property, the use of this component will cause an increase in the cost of production.

There is therefore a need for a method of producing fuels by blending components in an economical way. In addition, there is a need for a fuel blend that has good cold properties and is less expensive to production.

BRIEF DESCRIPTION OF THE INVENTION

An object of the present invention is to provide a method and means to alleviate the disadvantages discussed above. The present invention relates to a method of making a diesel fuel blend having enhanced cold properties; methods of lowering the cloud point of a mineral middle distillate fuel; and diesel fuel blends comprising a blend of a renewable fuel and a mineral middle distillate fuel. In addition, the invention relates to the use of renewable fuel, typically a hydrotreated renewable middle distillate to enhance the cold properties of a fuel composition comprising mineral middle distillate.

The invention is based on studies that evaluated the cold properties of mineral middle distillates, renewable fuels, and their blends. It was discovered that a combination of a mineral middle distillate fuel with a renewable fuel resulted in an enhancement of the cloud point and cold filter plugging point of the final blended fuel. It was also discovered that the cloud point and cold filter plugging point of certain blends were lower than the linear blending assumptions estimated based on the cloud points of the fuels and lower than the cloud point or cold filter plugging point of both the blend's components.

More specifically the present diesel fuel blend may be described as comprising a blend of a renewable fuel, such as hydrotreated renewable middle distillate, and a mineral middle distillate fuel in which the renewable fuel and mineral middle distillate fuel are present in a ratio of amounts by volume of from 10:90 to 90:10 and the diesel fuel blend contains 10-25 wt % n-paraffins in the C14-C20 range and an amount of isoparaffins in the C14-C20 range such that the ratio of the sum of wt % amounts of isoparaffins in the C14-C20 range to the sum of wt % amounts of n-paraffins in the C14-C20 range is less than 2.2. Experimentally it has now been shown that the diesel fuel blend has a cloud point that is lower than the weighted mean of the cloud points of the mineral middle distillate and the renewable fuel.

The synergistic effect described herein was surprising. Normally, blending results in a cloud point or cold filter plugging point that is higher (i.e. poorer) than the value of each individual component. This increases the costs of production because it is more expensive to produce fuels that have better cold properties. But in the present invention, middle distillate production can utilize the blending behavior disclosed by using less expensive components with poorer cloud points to achieve the cloud point target.

Furthermore, in the present invention, the amount of renewable or biocomponent in a fuel composition need not be limited to a maximum 7 vol % by the EN 590:2013 standard as required for ester-type biodiesel fuels, e.g., fatty acid methyl esters. Although higher amounts of fatty acid methyl esters may be considered, they require extra precautions because they can affect fuel stability, cold properties, engine oil dilution, and deposit formation in fuel injection systems.

The present invention shows that blending biocomponents into mineral middle distillate fuels is possible with renewable fuels such as hydrotreated renewable middle distillates to improve the cold temperature operability of the blended fuel. This is shown in the experimental part, where the measured cold properties of the blended fuel were better than the weighted mean of the cold properties of its components.

BRIEF DESCRIPTION OF THE DRAWINGS

The invention will be described in greater detail by means of preferred embodiments with reference to the attached accompanying drawings, in which.

DETAILED DESCRIPTION OF THE INVENTION

Figure 1:
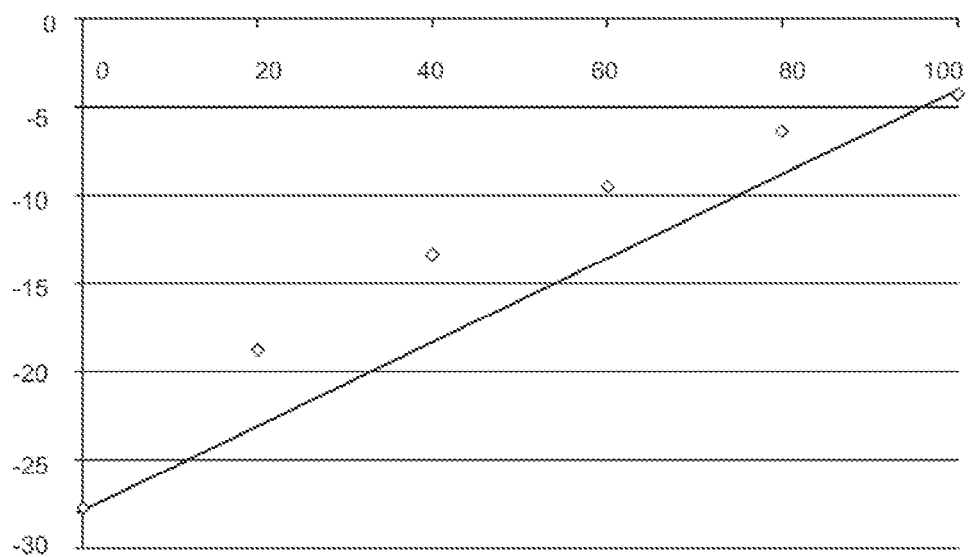
FIG. 1 shows the cloud point behavior in mineral diesel blends showing calculated cloud points of blends as a line and measured values as diamonds. The Y-axis is the cloud point (T; ° C.), and the X-axis is the increasing percentage (vol-% of the total blend volume) of the mineral diesel with poorer cloud point.

The present invention relates to fuel compositions, wherein enhancement of the cold properties of the final blended fuel composition is achieved by blending a mineral middle distillate component with a renewable fuel component. The present invention further relates to a method of making a diesel fuel blend having enhanced cold properties; methods of lowering the cloud point of a mineral middle distillate fuel; and diesel fuel blends comprising a blend of a renewable fuel component and a mineral middle distillate fuel component.

The term "cold properties" is used herein to refer to the cloud point and cold filter plugging point of a fuel. The cloud point of a mineral middle distillate fuel is the temperature at which the heaviest n-paraffins are no longer soluble but precipitate out from the fuel, giving it a cloudy appearance. Cloud point conveys the lowest storage temperature for the fuel to be usable and is one important parameter in a product's specification. Cloud point can be evaluated using, e.g., a method defined in ASTM D2500, D5771, D5772, D5773, D7689, or EN 23015. The cold filter plugging point of a fuel is the temperature at and below which wax in the fuel will cause severe restrictions when flowing through a filter. The cold filter plugging point is believed to correlate well with vehicle operability at lower temperatures. The cold filter plugging point of petroleum fuels is typically evaluated using ASTM D6371 or EN 116. Both cloud point and cold filter plugging point are measured and given as temperature (T, here ° C.).

The term "mineral" is used herein to denote components or compositions that are naturally occurring and derived from nonrenewable sources. Examples of such nonrenewable resources include petroleum oil or shale oil and combinations thereof. The term "mineral" also refers to the wastes of nonrenewable sources.

Middle distillate is typically diesel fuel or kerosene. In the present invention, mineral middle distillate is preferably mineral diesel. Diesel fuel in general is any liquid fuel used in diesel engines, whose fuel ignition takes place, without spark, as a result of compression of the inlet air mixture and then the injection of fuel. The most common type of diesel fuel is a specific fractional distillate of petroleum fuel oil. Distillation characteristics define how the fuel is evaporated when it is sprayed into the combustion chamber of a diesel engine. Standards (e.g., EN590) include information about typical distillation curves.

To distinguish from renewable diesel fuels not derived from petroleum, petroleum-derived diesel is referred to herein as "mineral diesel" or "mineral middle distillate". It may also be called, e.g., petrodiesel, fossil diesel, or petroleum distillate. Mineral diesel can comprise atmospheric or vacuum distillates. The distillate can comprise cracked gas oil or a blend of any proportion of straight run or thermally or catalytically cracked distillates. The distillate fuel can be subjected to further processing such as hydrogen treatment or other processes to improve fuel properties. Typically, mineral diesel comprises n- and isoparaffins at 10-70 weight %, naphtenics at 10-50 weight %, monoaromatics at 5-30 weight %, diaromatics at 0-10 weight %, and other aromatics at 0-5 weight %.

In the present invention, a hydrotreated renewable middle distillate component preferably comprises or consists of hydrotreated vegetable oil, hydrotreated animal fat, hydrotreated fish fat, hydrotreated fish oil, hydrotreated algae oil, hydrotreated microbial oil, hydrotreated wood and/or other plant based oil, hydrotreated recyclable waste and/or residue or a combination thereof. Preferably, the fresh feed of renewable fuel is selected from plant oils/fats, animal fats/oils, fish fats/oils, fats contained in plants bred by means of gene manipulation, recycled fats of food industry and combinations thereof. Hydrotreating vegetable oils or animal fats is an alternative process to esterification for producing bio-based middle distillate fuels. Hydrotreated renewable middle distillate fuels are also referred to as "hydrotreated vegetable oil fuels", "hydrotreated renewable diesels", "renewable fuels", "renewable diesels" or "renewable diesel components" instead of "biodiesel," which is reserved for fatty acid methyl esters (FAME). Chemically hydrotreated renewable middle distillates are mixtures of paraffinic hydrocarbons and have very low quantities of sulfur and aromatics. The cold properties of a hydrotreated renewable middle distillates can be adjusted to meet the local requirements by adjusting the amount of iso-paraffins by the severity of the process or by additional catalytic processing.

In the present invention, the isomerization ratio of the renewable fuel, such as hydrotreated renewable middle distillate is preferably at least 50%, more preferably at least 60%. Isomerization ratios of more than 80% may be achieved, but has drawbacks, such as increase in resources needed during the production. Preferably, the isomerization ratio of renewable fuel, such as hydrotreated renewable middle distillate is less than 69%, giving advantageous ranges from 50 to 69 and from 60 to 69% respectively. Higher isomerization ratio typically improves cold properties but such a hydrotreated renewable middle distillate consumes more resources during its production. The isomerization ratio means the total sum of iso-paraffins (weight %) divided by the total sum of paraffins (weight %). Since hydrotreated renewable middle distillates are hydrocarbons, they may be used as conventional middle distillate fuels. The fatty acid methyl ester specifications (EN 14214, ASTM D6751) do not apply for hydrotreated renewable middle distillates and therefore there is no volume percent limitation on how much hydrotreated renewable middle distillates may be blended with diesel fuel.

Specifically, the present invention relates to a fuel composition which comprises a renewable fuel component that is blended with a mineral middle distillate component, which are the main components of the present diesel fuel blend. Certain amounts of iso-paraffins and n-paraffins in the range of C15 to C18 create blends having good cold properties taking into account the resources used during the production. The invention relates to a diesel fuel blend comprising a blend of a renewable fuel and a mineral middle distillate fuel in which the renewable fuel and mineral middle distillate fuel are present in a ratio of amounts by volume of from 10:90 to 90:10 and the diesel fuel blend contains 10-25 wt % n-paraffins in the C14-C20 range and an amount of isoparaffins in the C14-C20 range such that the ratio of the sum of wt % amounts of isoparaffins in the C14-C20 range to the sum of wt % amounts of n-paraffins in the C14-C20 range is less than 2.2.

In one embodiment, the ratio of the sum of wt % amounts of isoparaffins in the C14-C20 range to the sum of wt % amounts of n-paraffins in the C14-C20 range is from 1.1 to 2.2. This composition creates good cold properties with low resource consumption during the production. The weight percentages given here for paraffins refer to wt % of the total blend fuel weight.

In one embodiment, in the composition, the amount of each C15-C18 iso-paraffin is equal to or more than 2.2 weight % of the total mass of the fuel composition, and the amount of each C15-C18 n-paraffin is equal to or more than 1.9 weight % of the total mass of the fuel composition. This composition creates good cold properties with low resource consumption during the production.

Preferably, the amount of each C15-C18 n-paraffin is less than 10 weight % of the total mass of the fuel composition, more preferably less than 9.6 weight %, and most preferably equal to or less than 7.9 weight %. As referred here, the C15-C18 paraffins are paraffins (straight chain or branched alkanes) having a carbon number of 15, 16, 17, or 18. The carbon number denotes the number of carbon atoms in each paraffin molecule. This composition creates good cold properties with low resource consumption during the production.

In one embodiment, the amount of at least one C15-C18 iso-paraffin is equal to or more than 3.0 weight % of the total mass of the fuel composition, and the amount of at least one C15-C18 n-paraffin is equal to or more than 2.2 weight % of the total mass of the fuel composition. This composition creates good cold properties with low resource consumption during the production.

In one embodiment, a preferred fuel composition is obtained when the following equation is satisfied for n-paraffins: the weight percentage of the n-paraffin in the range of C16 to C18 with the smallest weight percent subtracted from the weight percentage of the n-paraffin in the range of C16 to C18 with the largest weight percent divided by the weight percentage of the n-paraffin in the range of C16 to C18 with the largest weight percent, is equal to or more than 0.26 and preferably equal to or less than 0.45. In another embodiment, the amounts of n-paraffins C16 and C17 fulfill the equation $0.26 < (C16-C17)/C16 < 0.45$. This composition creates good cold properties with low resource consumption during the production.

In one embodiment, a preferred fuel composition is obtained when the following equation is satisfied for iso-paraffins: the weight percentage of the iso-paraffin in the range of C15 to C18 with the smallest weight percent subtracted from the weight percentage of the iso-paraffin in the range of C15 to C18 with the largest weight percent divided by the weight percentage of the iso-paraffin in the range of C15 to C18, with the largest weight percent is equal to or more than 0.49 and preferably equal to or less than 0.63. In another embodiment, the amounts of iso-paraffin carbon numbers C15 and C18 fulfill the equation $0.49 < (C18-C15)/C18 < 0.63$. This composition creates good cold properties with low resource consumption during the production.

In one embodiment, the difference between the cloud point and/or cold filter plugging point of the renewable fuel component and the mineral middle distillate component is equal to or less than 17° C., and more preferably, the difference is between 0 and 13.1° C. This difference creates good cold properties with low resource consumption during the production. Generally, the cloud point and cold filter plugging point in the blend is lower than the calculated (weighted mean) cloud points. The cold properties in the renewable fuel component may be better than the cold properties in the mineral middle distillate component. In the same way, the mineral middle distillate component may have better cold properties than the renewable fuel component in the blend.

The fuel composition may be a hydrocarbon fuel composition that may also contain generally used additives. The sum volume of the renewable fuel and the mineral middle distillate components is typically at least 98%, preferably at least 99% and most preferably at least 99.9% of the total blend fuel volume, the rest being generally used additives. The mineral middle distillate component may comprise more than one mineral component, and the renewable fuel component may comprise more than one renewable component. Preferably, the renewable fuel component is hydrotreated renewable middle distillate, and the mineral middle distillate component is mineral diesel.

According to a specific embodiment, the sum volume of the renewable fuel and the mineral middle distillate components is at least 90 vol %, preferably at least 93 vol %, This kind of blend may contain other components compatible with diesel engines, such as fatty acid methyl esters (FAME) up to 10 vol %, preferably up to 7 vol %. This composition creates good cold properties with low resource consumption during the production and allows the use of broader variety of components in blend.

The fuel can contain about 100% renewable fuel; however, in the present invention, the renewable fuel and mineral middle distillate components are blended in a volume percent ratio less than 100% (renewable:mineral middle distillate; 100:0). Preferably, the renewable fuel and mineral middle distillate components are blended in a volume percent ratio of less than 90:10 (renewable fuel:mineral middle distillate). In one embodiment, the renewable fuel and mineral middle distillate components are blended in a volume percent ratio of 20:80 to 80:20 (renewable fuel:mineral middle distillate). This composition creates good cold properties with low resource consumption during the production. In another embodiment, the renewable fuel and mineral middle distillate components are blended in a volume percent ratio of 20:80 to 60:40. This composition creates even better cold properties with low resource consumption during the production.

In another embodiment, the diesel fuel blend has isoparaffins in the C14-C20 range from 22 wt % to 55 wt % of the total blend fuel weight. This creates good cold properties with low resource consumption during the production.

The invention further relates to the use of hydrotreated renewable fuels for enhancing the cold properties of a fuel composition containing mineral middle distillate. The hydrotreated renewable fuel content in a mineral middle distillate blend can be determined by 14C isotope methods, which enable one skilled in the art to distinguish between fossil and renewable carbon. The principles of this method can be found in the standard ASTM D6866.

Any blend fuel as described above, may be produced by a method, which is next described. Herein is thus provided a method of making a diesel fuel blend having enhanced cold properties comprising selecting a renewable fuel and a mineral middle distillate fuel having cloud points that differ by no more than 17° C., preferably by no more than 13° C.; and blending the renewable fuel and mineral middle distillate fuel in a ratio of amounts by volume of from 10:90 to 90:10 to form a diesel fuel blend, wherein the diesel fuel blend contains 10-25 wt % n-paraffins in the C14-C20 range and an amount of isoparaffins in the C14-C20 range such that the ratio of the sum of wt % amounts of isoparaffins in the C14-C20 range to the sum of wt % amounts of n-paraffins in the C14-C20 range is less than 2.2, preferably from 1.1 to 2.2; and the diesel fuel blend has a cloud point that is lower than the weighted mean of the cloud points of the mineral middle distillate and the renewable fuel.

In one embodiment, is provided a method of use for lowering the cloud point of a mineral middle distillate fuel comprising: determining the cloud point of a mineral middle distillate fuel; selecting a renewable fuel having a cloud point that differs by no more than 17° C., preferably by no more than 13° C. from the cloud point of the mineral middle distillate fuel; and blending the renewable fuel and mineral middle distillate fuel in a ratio of amounts by volume of from 10:90 to 90:10 to form a diesel fuel blend having a cloud point that is lower than the cloud point of the mineral middle distillate fuel, wherein the diesel fuel blend contains 10-25 wt % n-paraffins in the C14-C20 range and an amount of isoparaffins in the C14-C20 range such that the ratio of the sum of wt % amounts of isoparaffins in the C14-C20 range to the sum of wt % amounts of n-paraffins in the C14-C20 range is less than 2.2 to form a diesel fuel blend having a cloud point that is lower than the cloud point of the mineral middle distillate.

In one embodiment, the invention relates to a method of use for lowering the cloud point of a mineral middle distillate fuel comprising: determining the cloud point of a mineral middle distillate fuel; selecting a renewable fuel having the following properties: (i) a cloud point that differs by no more than 17° C., preferably by no more than 13° C. from the cloud point of the mineral middle distillate fuel; (ii) an amount of n-paraffins sufficient to provide a diesel fuel blend containing 10-25 wt % n-paraffins in the C14-C20 range when the renewable fuel is blended with the mineral middle distillate fuel; and (iii) an amount of isoparaffins in the C14-C20 range sufficient to provide a diesel fuel blend having a ratio of the sum of wt % amounts of isoparaffins in the C14-C20 range to the sum of wt % amounts of n-paraffins in the C14-C20 range of from 1.1 to 2.2 when the renewable fuel is blended with the mineral middle distillate fuel; and blending the renewable fuel with the mineral middle distillate fuel in a ratio of amounts by volume of from 20:80 to 80:20 to form a diesel fuel blend having a cloud point that is lower than the cloud point of the mineral middle distillate.

In one embodiment, the invention relates to a method of use for lowering the cloud point of a renewable fuel comprising: determining the cloud point of a renewable fuel; selecting a mineral middle distillate fuel having a cloud point that differs by no more than 17° C., preferably by no more than 13° C., from the cloud point of the renewable fuel; and blending the renewable fuel and mineral middle distillate fuel in a ratio of amounts by volume of from 10:90 to 90:10 to form a diesel fuel blend having a cloud point that is lower than the cloud point of a renewable fuel, wherein the diesel fuel blend contains 10-25 wt % n-paraffins in the C14-C20 range and an amount of isoparaffins in the C14-C20 range such that the ratio of the sum of wt % amounts of isoparaffins in the C14-C20 range to the sum of wt % amounts of n-paraffins in the C14-C20 range is less than 2.2, preferably from 1.1 to 2.2, to form a diesel fuel blend having a cloud point that is lower than the cloud point of the renewable fuel.

A diesel fuel blend obtainable by a method or use as described above, has been experimentally shown to have enhanced cold properties in relation to components thereto.

EXAMPLES

The following examples are provided to better illustrate the claimed invention and are not to be interpreted as limiting the scope of the invention. To the extent that specific materials are mentioned, it is merely for purposes of illustration and is not intended to limit the invention. One skilled in the art may develop equivalent means or reactants without the exercise of inventive capacity and without departing from the scope of the invention. It will be understood that many variations can be made in the procedures described herein while still remaining within the bounds of the present invention. It is the intention of the inventors that such variations be included within the scope of the invention. The weight percentages given in relation to paraffins refer to wt % of the total blend fuel weight. The volume percentages given in relation to fuel components refer to vol % of the total blend fuel volume.

Comparative Example 1

To lower the cloud point of a mineral middle distillate (fossil fuel component) having a cloud point of −5.5° C. by −0.5 to −6° C. it is necessary to add to the fossil fuel component a second fuel component with a lower cloud point. Typically, when two or more fuel components with different cloud points are blended together the final blend has a higher cloud point than what would be expected based on the weighted mean value of the cloud points of the components. When 20 vol % of a renewable fuel component (Renewable G) with a cloud point of −28° C. was blended with the fossil component which has a cloud point of −5.5° C., a cloud point of 6.6° C. was achieved. The difference in cloud point between this renewable fuel component and the fossil fuel component was greater than 17° C., making it a comparative example. The weight percentages of n-paraffins of the blended fuels were measured by gas chromatography and are shown in Table 1 below.

Figure 2:
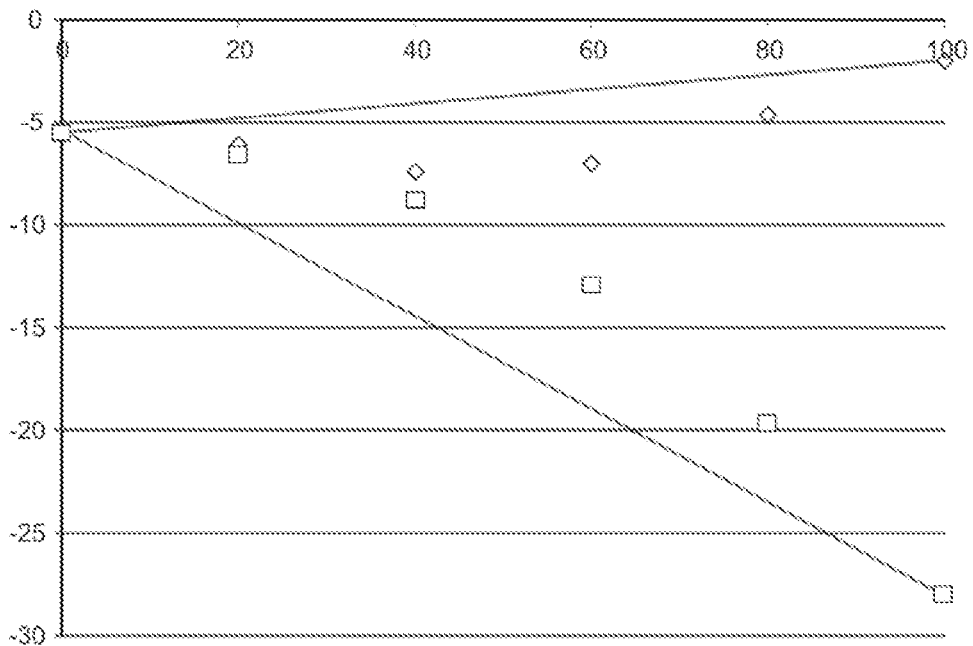
FIG. 2 shows the cloud points of the blend of Diesel 7 with Renewable F and Renewable G showing calculated cloud points of blends as a line and measured values as diamonds for renewable F (cloud point −2° C.) and as squares for renewable G (cloud point −28° C.). The Y-axis is the cloud point (T; ° C.), and the X-axis is the increasing percentage (vol-% of the total blend volume) of the renewables.
Figure 3:
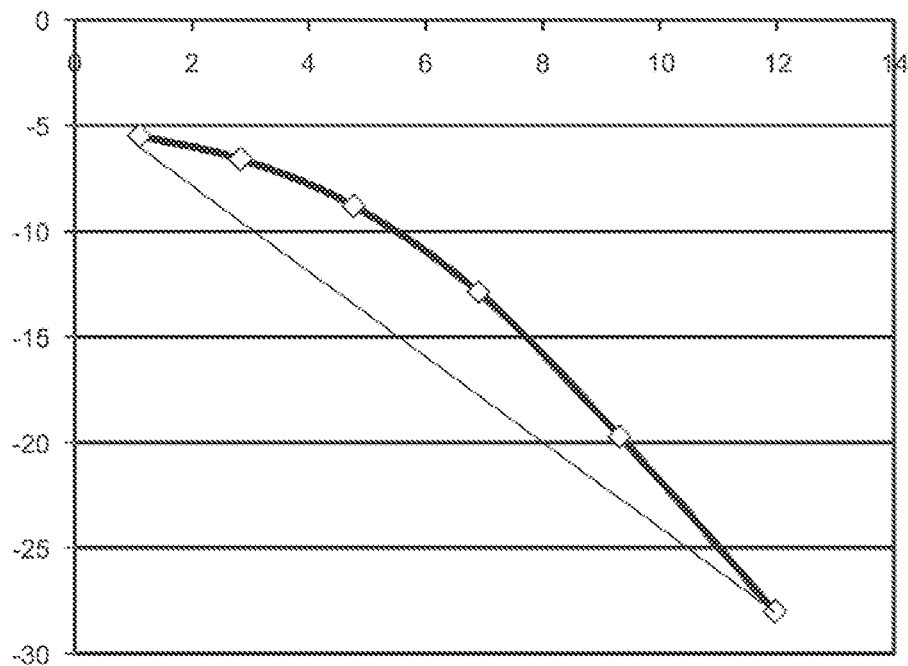
FIG. 3 shows the cloud point behavior of a blend of a renewable fuel with a cloud point of −28° C. and a mineral diesel with a cloud point of −5.5° C. The Y-axis is the cloud point (T; ° C.), and the X-axis is the ratio (wt-% of the total paraffin content) of iso-paraffins to n-paraffins.
Figure 4:
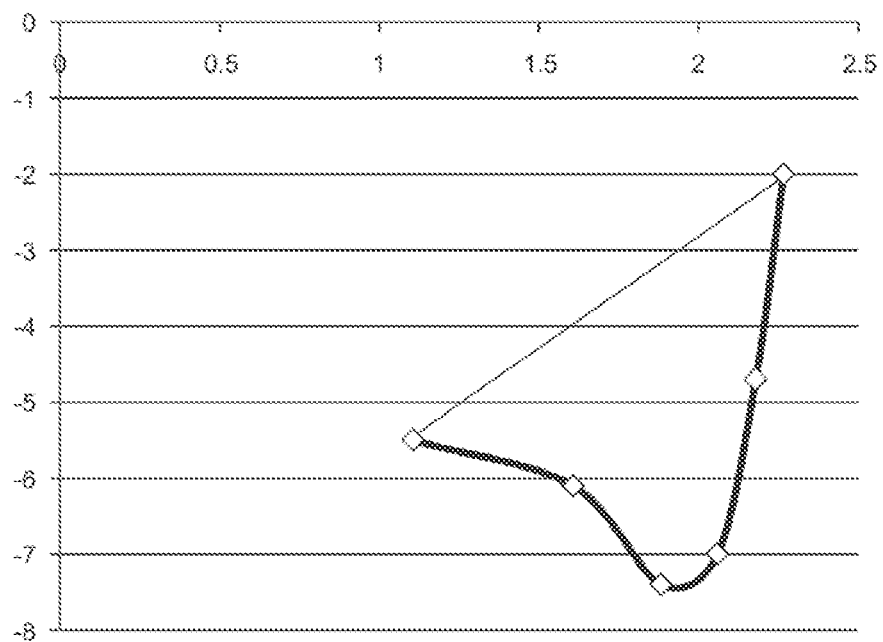
FIG. 4 shows the cloud point behavior of a blend of a renewable fuel with a cloud point of −2° C. and a mineral diesel with a cloud point of −5.5° C. The Y-axis is the cloud point (T; ° C.), and the X-axis is the ratio (wt-% of the total paraffin content) of iso-paraffins to n-paraffins in the C14-C20 range in said diesel fuel blend.

In the blend, the total wt-% of n-paraffins C14, C15, C16, C17, C18, C19, and C20 was 9.18%, the total wt-% of iso-paraffins C14, C15, C16, C17, C18, C19, and C20 was 26.09% and the ratio of n-paraffins/iso-paraffins in blend was 2.84. The cloud point of the blend could be lowered even further when the amount of renewable fuel with the −28° C. cloud point was increased to 40 vol-%, 60 vol-% and 80 vol-% in the blend. The cloud points of the resulting blends at various volume percentages are shown in FIG. 2. FIG. 3 shows the relationship between cloud point and paraffin ratio for the blends. For all ratios of renewable fuel to fossil fuel, however, the cloud points of the blends were higher than calculated by the weighted mean value of cloud points of the components (FIG. 2). This was as predicted according to current practice.

The weight percentages of n-paraffins in the fuel components before blending were measured by gas chromatography and are shown in Table 1. The weight percentages of n-paraffins in the blended fuel compositions were measured by gas chromatography (Table 2). The weight percentages of iso-paraffins in the fuels to be blended were measured by gas chromatography (Table 3). The weight percentages of iso-paraffins in the blended fuel compositions were measured (Table 4). In the above-mentioned blends, the cumulative sums of n-paraffins C14, C15, C16, C17, C18, C19, and C20 were 9.18-7.78 wt-%, the cumulative sums of iso-paraffins C14, C15, C16, C17, C18, C19, and C20 were 26.09-72.46 wt-% and the ratios of the cumulative sum of iso-paraffins C14, C15, C16, C17, C18, C19, and C20 and the cumulative sum of n-paraffins C14, C15, C16, C17, C18, C19, and C20 were 2.84-9.31 wt-%.

Example 1

When 20 vol % of a renewable fuel (Renewable F) which has a cloud point of −2° C. was blended with 80 vol % of a fossil component which has a cloud point of −5.5° C., a lower cloud point than the cloud point of either component was achieved. This synergist effect is achieved when the ratio of the cumulative sum of iso-paraffins C14, C15, C16, C17, C18, C19, and C20 and the cumulative sum of n-paraffins C14, C15, C16, C17, C18, C19, and C20 in the blend was 1.6. The cumulative sum of n-paraffins C14, C15, C16, C17, C18, C19, and C20 in the blend was 13.6 wt-%. The cumulative sum of iso-paraffins C14, C15, C16, C17, C18, C19, and C20 in the blend was 21.87 wt-%.

Example 2

When 40 vol % of a renewable fuel (Renewable F) which has a cloud point of −2° C. was blended with 60 vol % of a fossil component which has a cloud point of −5.5° C., a lower cloud point than the cloud point of either component was achieved. This synergist effect is achieved when the ratio of the cumulative sum of iso-paraffins C14, C15, C16, C17, C18, C19, and C20 and the cumulative sum of n-paraffins C14, C15, C16, C17, C18, C19, and C20 in the blend was 1.9. The cumulative sum of n-paraffins C14, C15, C16, C17, C18, C19, and C20 in the blend was 17.6 wt-%. The cumulative sum of iso-paraffins C14, C15, C16, C17, C18, C19, and C20 in the blend was 33.11 wt-%.

Example 3

When 60 vol % of a renewable fuel (Renewable F) which has a cloud point of −2° C. was blended with 40 vol % of a fossil component which has a cloud point of −5.5° C., a lower cloud point than the cloud point of either component was achieved. This synergist effect is achieved when the ratio of the cumulative sum of iso-paraffins C14, C15, C16, C17, C18, C19, and C20 and the cumulative sum of n-paraffins C14, C15, C16, C17, C18, C19, and C20 in the blend was 2.05. The cumulative sum of n-paraffins C14, C15, C16, C17, C18, C19, and C20 in the blend was 21.55 wt-%. The cumulative sum of iso-paraffins C14, C15, C16, C17, C18, C19, and C20 in the blend was 44.4 wt-%.

Example 4

When 80 vol-% of a renewable fuel (Renewable F) which has a cloud point of −2° C. was blended with 20 vol % a fossil component which has a cloud point of −5.5° C., a lower cloud point than the cloud point of either component was achieved. This synergist effect is achieved when the ratio of the cumulative sum of iso-paraffins C14, C15, C16, C17, C18, C19, and C20 and the cumulative sum of n-paraffins C14, C15, C16, C17, C18, C19, and C20 in the blend was 2.18. The cumulative sum of n-paraffins C14, C15, C16, C17, C18, C19, and C20 in the blend was 25.5 wt-%. The cumulative sum of iso-paraffins C14, C15, C16, C17, C18, C19, and C20 in the blend was 55.6 wt-%.

The following tables report the data from Comparative Example 1 and Examples 1-4. The weight percentages of n-paraffins in the fuels to be blended were measured by gas chromatography and are shown in Table 1. The weight percentages of n-paraffins in the blended fuel compositions were measured by gas chromatography (Table 2). The weight percentages of iso-paraffins in the fuels to be blended were measured by gas chromatography (Table 3). The weight percentages of iso-paraffins in the blended fuel compositions were measured (Table 4).

TABLE 1

The weight % of n-paraffins of the fuel components.

| Carbon number n-paraffin | Renewable F | Renewable G |
|---|---|---|
| 14 | 0.41 | 0.26 |
| 15 | 5.49 | 1.75 |
| 16 | 9.57 | 2.21 |
| 17 | 5.09 | 1.65 |
| 18 | 8.83 | 1.44 |
| 19 | 0.05 | 0.02 |
| 20 | 0.06 | 0.01 |

TABLE 2

The weight % of n-paraffins in the blended fuel compositions.

| Carbon number n-paraffin | 20% Renew. F | 20% Renew. G | 40% Renew. F | 40% Renew. G | 60% Renew. F | 60% Renew. G | 80% Renew. F | 80% Renew. G |
|---|---|---|---|---|---|---|---|---|
| 14 | 1.15 | 1.12 | 0.97 | 0.91 | 0.78 | 0.69 | 0.59 | 0.47 |
| 15 | 2.31 | 1.57 | 3.11 | 1.61 | 3.90 | 1.66 | 4.69 | 1.70 |
| 16 | 3.01 | 1.54 | 4.65 | 1.70 | 6.29 | 1.87 | 7.93 | 2.04 |
| 17 | 2.23 | 1.54 | 2.94 | 1.57 | 3.66 | 1.60 | 4.38 | 1.62 |
| 18 | 2.79 | 1.31 | 4.30 | 1.34 | 5.81 | 1.37 | 7.32 | 1.41 |
| 19 | 1.12 | 1.12 | 0.86 | 0.84 | 0.59 | 0.57 | 0.32 | 0.29 |
| 20 | 0.99 | 0.98 | 0.76 | 0.74 | 0.52 | 0.49 | 0.29 | 0.25 |

TABLE 3

The weight % of iso-paraffins of the fuel components.

| Carbon number iso-paraffin | Renewable F | Renewable G |
|---|---|---|
| 14 | 0.82 | 1.69 |
| 15 | 8.64 | 15.07 |
| 16 | 18.83 | 24.92 |
| 17 | 14.21 | 20.70 |
| 18 | 23.80 | 24.97 |
| 19 | 0.28 | 0.32 |
| 20 | 0.26 | 0.24 |

TABLE 4

The weight % of iso-paraffins in the blended fuel compositions.

| Carbon number i-paraffin | 20% Renew. F | 20% Renew. G | 40% Renew. F | 40% Renew. G | 60% Renew. F | 60% Renew. G | 80% Renew. F | 80% Renew. G |
|---|---|---|---|---|---|---|---|---|
| 14 | 1.55 | 1.72 | 1.37 | 1.71 | 1.19 | 1.70 | 1.00 | 1.69 |
| 15 | 2.95 | 4.24 | 4.37 | 6.95 | 5.80 | 9.65 | 7.22 | 12.36 |
| 16 | 4.89 | 6.10 | 8.37 | 10.81 | 11.86 | 15.51 | 15.34 | 20.22 |
| 17 | 4.08 | 5.38 | 6.61 | 9.21 | 9.14 | 13.04 | 11.68 | 16.87 |
| 18 | 5.75 | 5.99 | 10.27 | 10.73 | 14.78 | 15.48 | 19.29 | 20.23 |
| 19 | 1.52 | 1.53 | 1.21 | 1.23 | 0.90 | 0.93 | 0.59 | 0.63 |
| 20 | 1.13 | 1.13 | 0.91 | 0.90 | 0.70 | 0.68 | 0.48 | 0.46 |

In these examples the composition of the fossil component was such that the cumulative sum of iso-paraffins C14, C15, C16, C17, C18, C19, and C20 was 10.63 wt-%, the cumulative sum of iso-paraffins C8, C9, C10, C11, C12, and C13 was 6.45 wt-%, the cumulative sum of iso-paraffins C21, C22, C23, C24, C25, and C26 was 3.13 wt-%, the cumulative sum of n-paraffins C14, C15, C16, C17, C18, C19, and C20 was 9.63 wt-%, the cumulative sum of 4-paraffins C8, C9, C10, C11, C12, and C13 was 3.84 wt-%, the cumulative sum of n-paraffins C21, C22, C23, C24, C25, and C26 was 2.58 wt-%.

Comparative Example 2

When 20 vol-%, 40 vol-%, 60 vol-% and 80 vol-% of a renewable fuel component with a cloud point −35° C. was blended with a fossil fuel component with a cloud point of 5.5° C., all cloud points of the blends were higher than calculated by weighted mean value of cloud points of components. This was as predicted according to current practice. In the above-mentioned blends, the cumulative sums of n-paraffins C14, C15, C16, C17, C18, C19, and C20 were 8.41-4.50 wt-%. The cumulative sums of iso-paraffins C14, C15, C16, C17, C18, C19, and C20 were 26.25-76.25 wt-%. The ratios of the cumulative sum of iso-paraffins C14, C15, C16, C17, C18, C19, and C20 and the cumulative sum of n-paraffins C14, C15, C16, C17, C18, C19, and C20 were 3.1-17.0. The weight percentages of iso- and n-paraffins in the blended fuel compositions were measured by gas chromatography.

Comparative Example 3

When 20 vol-%, 40 vol-%, 60 vol-% and 80 vol-% of a renewable diesel fuel component with a cloud point −27° C. was blended with a fossil fuel component with a cloud point of −5.5° C., all cloud points of the blends were higher than calculated by weighted mean value of cloud points of components. This was as predicted according to current practice. In the above-mentioned blends, the cumulative sums of n-paraffins C14, C15, C16, C17, C18, C19, and C20 were 9.16-7.70 wt-%, the cumulative sums of iso-paraffins C14, C15, C16, C17, C18, C19, and C20 were 26.00-75.22 wt-% and the ratios of the cumulative sum of iso-paraffins C14, C15, C16, C17, C18, C19, and C20 and the cumulative sum of n-paraffins C14, C15, C16, C17, C18, C19, and C20 were 2.6-6.8. The weight percentages of iso- and n-paraffins in the blended fuel compositions were measured by gas chromatography.

Comparative Example 4

When 20 vol-%, 40 vol-%, 60 vol-% and 80 vol-% of a renewable diesel fuel component with a cloud point −23° C. was blended to with a fossil fuel component with a cloud point of −5.5° C., all cloud points of the blends were higher than calculated by weighted mean value of cloud points of components. This was as predicted according to current practice. In the above-mentioned blends, the cumulative sums of n-paraffins C14, C15, C16, C17, C18, C19, and C20 were 9.61-9.53 wt-%, the cumulative sums of iso-paraffins C14, C15, C16, C17, C18, C19, and C20 were 25.66-73.76 wt-% and the ratios of the cumulative sum of iso-paraffins C14, C15, C16, C17, C18, C19, and C20 and the cumulative sum of n-paraffins C14, C15, C16, C17, C18, C19, and C20 were 2.7-7.7. The weight percentages of iso- and n-paraffins in the blended fuel compositions were measured by gas chromatography.

Comparative Example 5

Two mineral diesel blends having different cloud points were blended. The cloud points of the blends were measured by a method defined in EN 23015 and EN 116. Measured cloud point values for mineral diesel blends are presented in Table 5 and FIG. 1, respectively. The calculated linear values in Table 5 are based on linear behavior, which means a weighted mean of cloud points of the components. The linear behavior is average of the cloud points and it is in other words accomplished by weighting the cloud points of components by the volume percent of components in the blend. Analysis shows that the poorer cloud point component dominates.

TABLE 5

Cloud points of mineral diesel blends.

| Volume percent (%) of Diesel with cloud point −27.8° C. | Volume percent (%) of Diesel with cloud point −4.3° C. % | Cloud point of blend ° C. (measured) | Cloud point of blend ° C. (calculated linear) |
|---|---|---|---|
| 80% | 20% | −18.8 | −23.1 |
| 60% | 40% | −13.3 | −18.4 |
| 40% | 60% | −9.5 | −13.7 |
| 20% | 80% | −6.4 | −9.0 |

FIG. 1 shows that components with poorer cloud point values dominated in the mineral diesel blends. The term "poorer" means a higher temperature value of a cloud point or cold filter plugging point, and the term "better" means a lower temperature value of a cloud point or cold filter plugging point.

Example 5

Renewable hydrotreated vegetable oil compositions with different cold properties were blended with mineral diesel in different volumes. The cloud points and/or cold filter plugging points of the blends were measured by methods defined in EN 23015 and EN 116 and are shown in Table 6. It can be seen that the blending produced lower, i.e., better, measured cloud points and cold filter plugging points than expected by calculating a weighted mean of cloud points of the components. In some cases, the blend had even better cold properties than the cold properties of its individual components. Measured cloud points were even more than 3° C. better compared to the calculated weighted mean of cold properties. Also, the cold filter plugging points were better in blends than in neat mineral fuel.

TABLE 6

Cloud points and cold filter plugging points of mineral diesel and renewable hydrotreated vegetable oil diesel blends.

| | Cloud point, ° C. (measured) | Cold filter plugging point, ° C. (measured) | Cloud point weighted mean | Cold filter plugging point weighted mean, ° C. | Cloud point difference of components, ° C. |
|---|---|---|---|---|---|
| Renewable A | 6.5 | 4 | | | |
| Diesel 1 | −4.3 | −6 | | | |
| 20% Renewable A + 80% Diesel 1 | −5.5 | −8 | −2.1 | −4 | 10.8 |
| Diesel 2 | −5.1 | −6 | | | |
| 20% Renewable A + 80% Diesel 2 | −6.1 | −9 | −2.8 | −4 | 11.6 |
| Diesel 3 | −3.8 | −5 | | | |
| 20% Renewable A + 80% Diesel 3 | −4.8 | −7 | −1.7 | −3.2 | 10.3 |
| Renewable B | −2.0 | −5 | | | |
| Diesel 1 | −4.3 | −6 | | | |
| 20% Renewable B + 80% Diesel 1 | −5.6 | −9 | −3.8 | −5.8 | 2.3 |
| Diesel 2 | −5.1 | −6 | | | |
| 20% Renewable B + 80% Diesel 2 | −6.3 | −8 | −4.5 | −5.8 | 3.1 |
| Diesel 3 | −3.8 | −5 | | | |
| 20% Renewable B + 80% Diesel 3 | −5.0 | −7 | −3.4 | −5 | 1.8 |
| Renewable C | −1.1 | −4 | | | |
| Diesel 2 | −5.1 | −6 | | | |
| 20% Renewable C + 80% Diesel 2 | −6.4 | −8 | −4.3 | −5.6 | 4 |
| Renewable D | −15.3 | −15 | | | |
| Diesel 4 | −28.0 | −29 | | | |
| 20% Renewable D + 80% Diesel 4 | −28.5 | −36 | −25.5 | −26.2 | 12.7 |

TABLE 6-continued

Cloud points and cold filter plugging points of mineral diesel and renewable hydrotreated vegetable oil diesel blends.

| | Cloud point, ° C. (measured) | Cold filter plugging point, ° C. (measured) | Cloud point weighted mean | Cold filter plugging point weighted mean, ° C. | Cloud point difference of components, ° C. |
|---|---|---|---|---|---|
| 40% Renewable D + 60% Diesel 4 | −26.3 | −27 | −22.9 | −23.4 | 12.7 |
| 50% Renewable D + 50% Diesel 4 | −24.8 | −24 | −21.7 | −22 | 12.7 |
| 60% Renewable D + 40% Diesel 4 | −22.5 | −23 | −20.4 | −20.6 | 12.7 |
| 80% Renewable D + 20% Diesel 4 | −19.1 | −19 | −17.8 | −17.8 | 12.7 |
| Diesel 5 | −28.4 | −28 | | | |
| 20% Renewable D + 80% Diesel 5 | −26.8 | −29 | −25.8 | −25.4 | 13.1 |
| Diesel 5 | −28.4 | −28 | | | |
| 50% Renewable D + 50% Diesel 5 | −23.4 | −23 | −21.9 | −21.5 | 13.1 |
| Renewable H | −9.8 | −12 | | | |
| Diesel 8 | −3.9 | −15 | | | |
| 80% Renewable H + 20% Diesel 8 | −11.8 | | −8.6 | | 5.9 |
| 60% Renewable H + 40% Diesel 8 | −10.9 | | −7.4 | | 5.9 |
| 40% Renewable H + 60% Diesel 8 | −8.1 | | −7.0 | | 5.9 |
| 20% Renewable H + 80% Diesel 8 | −5.7 | | −5.1 | | 5.9 |

In contrast to the cloud point value, the cold filter plugging point value can be improved by cold flow improver additives, which are typically polyethylenevinylacetates, i.e., poly-EVAs. Other typical additives are lubricity improvers and electricity conductive improvers. Diesel 6 and Diesel 8 include cold flow improvers.

Example 6

Seven percent fatty acid methyl ester was added to the 100% renewable hydrotreated vegetable oil diesel (Renewable E) or its blend with mineral diesel (Diesel 6). The cloud points and the calculated cloud point weighted mean of the Diesel 6 and Renewable E blend with the addition of fatty acid methyl ester were measured.

TABLE 7

The cloud points and the calculated cloud point weighted mean of the mineral diesel (Diesel 6) and renewable hydrotreated vegetable oil diesel (Renewable E) blend with the addition of fatty acid methyl ester.

| | Cloud point, ° C. (measured) | Weighted mean of cloud point of Diesel 6 and Renewable E | Cloud point difference of fossil and renewable diesel components, ° C. |
|---|---|---|---|
| Renewable E | −10 | | |
| Diesel 6 | −5 | | |
| 80% Renewable E + 20% Diesel 6 | −11.8 | −9 | 5 |
| 60% Renewable E + 40% Diesel 6 | −10.9 | −8 | 5 |
| 7% fatty acid methyl ester and 93% Renewable E + 0% Diesel 6 | −9 | −10 | 5 |
| 7% fatty acid methyl ester and 93% blend of 80% Renewable E + 20% Diesel 6 | −10.8 | −9 | 5 |
| 7% fatty acid methyl ester and 93% blend of 60% Renewable E + 40% Diesel 6 | −10.5 | −8 | 5 |

In Example 7, the cloud point difference between Diesel 6 and Renewable E is 5° C. Results show that fatty acid methyl ester as a blending component causes poorer cloud point, but blending according to present invention can alleviate this effect. Hence, according to one embodiment of the present invention, blending up to 7 vol-% fatty acid methyl ester, with blend fuel of renewable fuel and mineral middle distillate according to claim 1, the cloud point, which is lower than the weighted mean of its components, can be achieved. Said cloud point may even be lower than that of any individual component.

It will be apparent to a person skilled in the art that, as the technology advances, the inventive concept can be implemented in various ways. The subject matter in the above described embodiments may be combined in any permutations or manner. The same applies to subject matter of all dependent claims which may be used in any combination to restrict the independent claims. The invention and its

The invention claimed is:

1. A method of making a diesel fuel blend having enhanced cold properties, the method comprising:
   selecting a renewable fuel component and a mineral middle distillate fuel component having cloud points that differ by no more than a pre-selected temperature value; and
   blending the selected renewable fuel component and the selected mineral middle distillate fuel component in a ratio of amounts by volume of from 10:90 to 90:10 to form a diesel fuel blend that comprises 10-25 wt % n-paraffins in a C14-C20 range and an amount of iso-paraffins in a C14-C20 range such that a ratio of a sum of wt % amounts of the iso-paraffins in the C14-C20 range to a sum of wt % amounts of the n-paraffins in the C14-C20 range is less than 2.2 or is from 1.1 to 2.2.

2. The method of claim 1, wherein the blending is performed so that the ratio of the sum of wt % amounts of the iso-paraffins in the C14-C20 range to the sum of wt % amounts of the n-paraffins in the C14-C20 range is less than 2.2 and is also greater than or equal to 1.1.

3. The method of claim 1, wherein the renewable fuel component is a hydrotreated renewable middle distillate component.

4. The method of claim 3, wherein the hydrotreated renewable middle distillate component comprises one or more of: a hydrotreated vegetable oil, a hydrotreated animal fat, a hydrotreated fish fat, a hydrotreated fish oil, a hydrotreated algae oil, a hydrotreated microbial oil, a hydrotreated wood, a hydrotreated plant based oil, a hydrotreated recyclable waste, and a hydrotreated recyclable residue.

5. The method of claim 3, wherein the hydrotreated renewable middle distillate component has an isomerization ratio of at least 50% or at least 60%.

6. The method of claim 3, wherein the hydrotreated renewable middle distillate component has an isomerization ratio of from 50% to 69%.

7. The method of claim 1, wherein the selected renewable fuel component and the selected mineral middle distillate fuel component are blended in a ratio of amounts by volume of from 20:80 to 80:20.

8. The method of claim 1, wherein the pre-selected temperature value is 1.8° C., 2.3° C., 3.1° C., 3.5° C., 4° C., 5° C., 10.3° C., 10.8° C., 11.6° C., 12.7° C., 13° C., 13.1° C., or 17° C.

9. A diesel fuel blend comprising:
   a renewable fuel component and a mineral middle distillate fuel component in which the renewable fuel component and mineral middle distillate fuel component are present in the diesel fuel blend in a ratio of amounts by volume of from 10:90 to 90:10; and
   the diesel fuel blend of the renewable fuel component and the mineral middle distillate fuel component having 10-25 wt % n-paraffins in a C14-C20 range and an amount of iso-paraffins in the C14-C20 range, such that a ratio of a sum of wt % amounts of the iso-paraffins in the C14-C20 range to a sum of wt % amounts of the n-paraffins in the C14-C20 range is less than 2.2 or is from 1.1 to 2.2.

10. The diesel fuel blend of claim 9, wherein the ratio of the sum of wt % amounts of the iso-paraffins in the C14-C20 range to the sum of wt % amounts of the n-paraffins in the C14-C20 range is less than 2.2 and greater than or equal to 1.1.

11. The diesel fuel blend of claim 9, wherein the renewable fuel component is a hydrotreated renewable middle distillate component.

12. The diesel fuel blend of claim 11, wherein the diesel fuel blend also includes fatty acid methyl esters (FAME).

13. The diesel fuel blend of claim 12, wherein a sum volume of the hydrotreated renewable middle distillate component and the mineral middle distillate component in the diesel fuel blend is an amount that is at least 90 vol % and the diesel fuel blend also includes fatty acid methyl esters (FAME) in an amount that is up to 10 vol % of the diesel fuel blend.

14. The diesel fuel blend of claim 12, wherein a sum volume of the hydrotreated renewable middle distillate and the mineral middle distillate component in the diesel fuel blend is an amount that is at least 93 vol % of the diesel fuel blend and the diesel fuel blend also includes fatty acid methyl esters (FAME) in an amount that is up to 7 vol % of the diesel fuel blend.

15. The diesel fuel blend of claim 11, wherein the hydrotreated renewable middle distillate component comprises one or more of: a hydrotreated vegetable oil, a hydrotreated animal fat, a hydrotreated fish fat, a hydrotreated fish oil, a hydrotreated algae oil, a hydrotreated microbial oil, a hydrotreated wood, a hydrotreated plant based oil, a hydrotreated recyclable waste, and a hydrotreated recyclable residue.

16. The diesel fuel blend of claim 9, wherein the renewable fuel component and the mineral middle distillate fuel component are present in the diesel fuel blend in a ratio of amounts by volume of from 20:80 to 80:20.

17. The diesel fuel blend of claim 11, wherein the hydrotreated renewable middle distillate component and the mineral middle distillate fuel component are present in the diesel fuel blend in a ratio of amounts by volume of from 20:80 to 80:20.

18. The diesel fuel blend of claim 11, wherein the diesel fuel blend includes the hydrotreated renewable middle distillate component between 10 vol % and 20 vol % of a volume of the diesel fuel blend.

19. The diesel fuel blend of claim 11, wherein the hydrotreated renewable middle distillate component includes a mixture of paraffinic hydrocarbons.

20. A fuel blend comprising:
   a renewable fuel component and a mineral middle distillate fuel component in which the renewable fuel component and mineral middle distillate fuel component are present in the fuel blend in a ratio of amounts by volume of from 10:90 to 90:10; and
   the fuel blend of the renewable fuel component and the mineral middle distillate fuel component having 10-25 wt % n-paraffins in a C14-C20 range and an amount of iso-paraffins in the C14-C20 range, such that a ratio of a sum of wt % amounts of the iso-paraffins in the C14-C20 range to a sum of wt % amounts of the n-paraffins in the C14-C20 range is less than 2.2 or is from 1.1 to 2.2.

* * * * *